June 16, 1942.  R. H. GODDARD  2,286,908
AUXILIARY TURBINE FOR ROCKET CRAFT
Filed Aug. 7, 1940   2 Sheets-Sheet 1
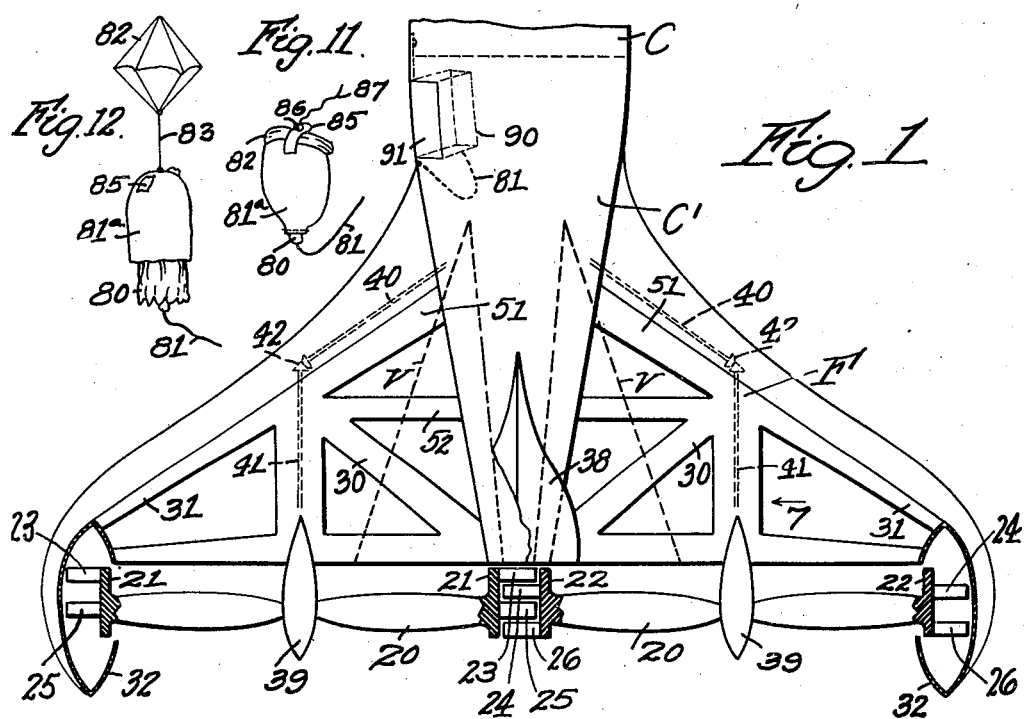
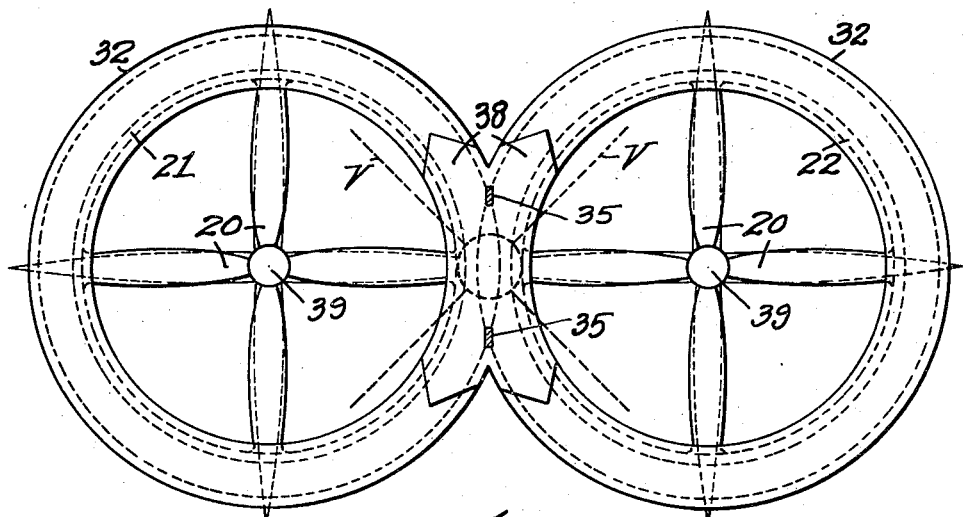
Inventor
Robert H. Goddard
By attorney
Chas. T. Hawley

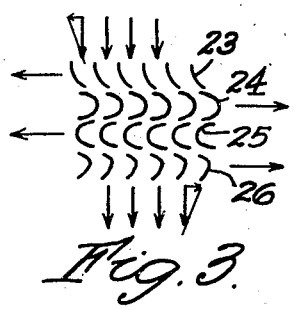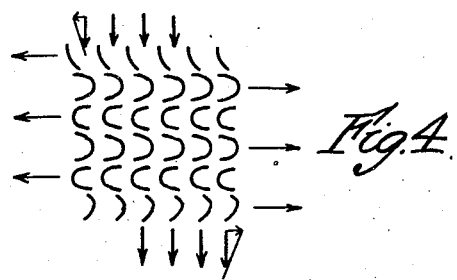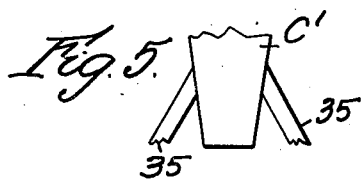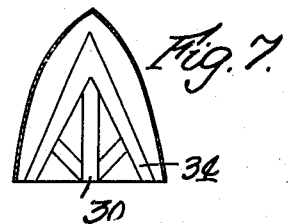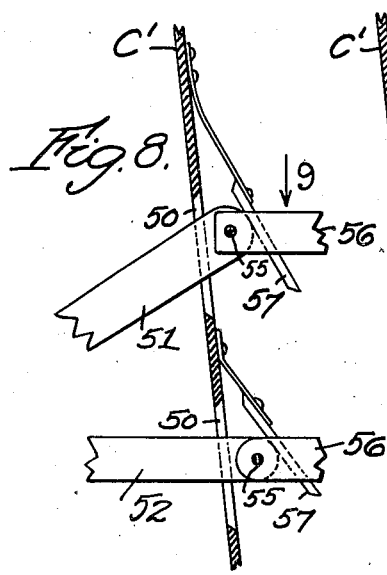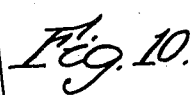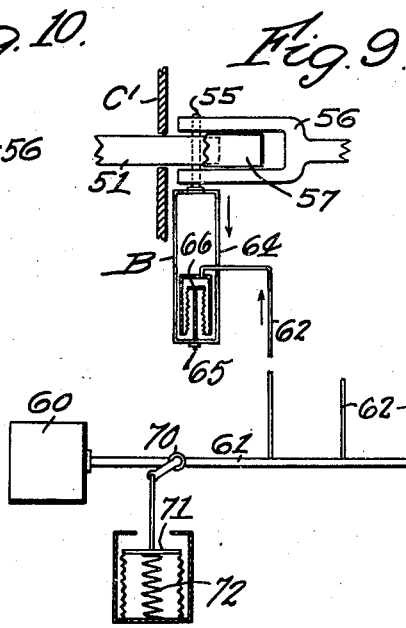

Patented June 16, 1942

2,286,908

UNITED STATES PATENT OFFICE 2,286,908

AUXILIARY TURBINE FOR ROCKET CRAFT

Robert H. Goddard, Roswell, N. Mex.

Application August 7, 1940, Serial No. 351,689

13 Claims. (Cl. 244—62)

This invention relates to aircraft which are propelled in normal flight by a rocket blast. It is well known that such propulsion is extremely inefficient at low aircraft speed, as under these conditions a large part of the kinetic energy of the blast is wasted, while only a comparatively small part reacts effectively to propel the craft.

It has been proposed to increase the efficiency of such rocket craft at low speed by providing one or more turbine-driven propellers at the rear of the craft, and by driving the turbines by the direct action of the rocket blast. By using a sufficient number of expansion stages in the turbines, the energy of the gas can be quite largely transferred to the propellers and the gases will be discharged from the craft at low relative speed and with much reduced waste of energy.

Such turbines and propellers, however, are most effective at relatively low aircraft speed and when operating in a relatively dense atmosphere. At higher speeds and in less dense atmosphere, the rocket blast should operate directly and in the usual manner, without interference by interposed turbine blades.

In my prior Patent No. 1,809,271, I show means for displacing the turbines transversely of the aircraft and out of the path of the rocket blast but these parts are still retained on the craft. For long range flight, however, it is not desirable to thus permanently burden the craft with the weight of the turbine and propeller structure, which structure serves no useful purpose after the turbines cease to operate.

It is the general object of my present invention to provide auxiliary turbines and propellers and supporting structure therefor, so designed and constructed that said auxiliary structure can be disengaged and discarded from the aircraft when a sufficient speed of the craft has been attained. I also provide improved means for releasing the auxiliary structure and for safely returning said structure to the ground.

A preferred form of the invention is shown in the drawings, in which

Fig. 1 is a plan view, partly in section, of a rear portion of an aircraft embodying my improvements;

Fig. 2 is an elevation of certain parts shown in Fig. 1, looking toward the rear of the craft;

Figs. 3 and 4 are diagrammatic views showing two arrangements of turbine blade structure;

Fig. 5 is a side elevation of a rear portion of the rocket craft and certain turbine supporting members;

Fig. 6 is a section of a streamlined casing;

Fig. 7 is a sectional side elevation of a portion of casing and supporting structure, looking in the direction of the arrow 7 in Fig. 1;

Fig. 8 is a detail sectional elevation, showing releasable connections for the turbine supporting structure;

Fig. 9 is a sectional view of said connections, looking in the direction of the arrow 9 in Fig. 8 and also showing operating devices for the releasable connections;

Fig. 10 is a sectional view showing certain parts appearing in Fig. 8 but in a different position;

Fig. 11 is a side elevation of a parachute attachment; and

Fig. 12 is a similar view showing the pilot parachute open.

Referring to the drawings, I have shown my invention applied to a rocket craft of the type shown in my prior Patent No. 2,183,311 in which the rear portion C' of the casing C is movably mounted, and in which relative swinging movement of the casing portion C' is utilized for steering the craft. Steering vanes V may be provided on the casing C' as indicated in Figs. 1 and 2.

The turbine and propeller structure shown herein is of the general type shown in my prior Patent No. 1,809,271 and comprises two separate turbines mounted at opposite sides of the axis of the craft and each comprising propeller blades 20 and encircling rims 21 and 22 having sets of coacting turbine blades 23, 24, 25 and 26.

The arrangement and operation of these blades is clearly shown in Fig. 3, in which it will appear that the rocket blast enters the blades 23 at an angle, the tangent of which is the ratio of the blade velocity to the gas velocity. Since this ratio is small, the entering edges of the first set of blades are substantially tangential to the axis of the craft. The blast is discharged therefrom at a transverse angle, is repeatedly reversed in successive stages through successive sets of blades, and is finally discharged from the blades 25 substantially in a rearward axial direction and at greatly reduced speed. The tangent of the angle of the entering edges of the last set of vanes is also the ratio of the blade velocity to the gas velocity, which is small on leaving the vanes. Velocity diagrams are indicated in Figs. 3 and 4, the latter figure showing similar blade structure but with an increase in the number of intermediate expansion stages.

It is essential that the blades be so distributed between the two rims 21 that each turbine will receive substantially the same turning force. Otherwise, the speeds of the propellers will differ and the craft will tend to follow a curved path. For a more complete description of the construction and operation of the turbines, reference is made to my prior Patent No. 1,809,271, previously cited.

The two turbines are mounted on a supporting frame structure F which is carried by the movable aircraft casing portion C' but which is detachably secured thereto. This supporting frame structure comprises relatively heavy laterally extending frame members 30 (Fig. 1) which support the propeller shafts and bearings, and lighter frame extensions 31 which support streamlined housings 32 for the propeller rims.

Side braces 34 (Fig. 7) are provided to additionally brace and support the propeller shaft bearings and to resist any tendency of the turbines to displace said bearings transversely to the plane of the frame members 30. Center braces 35 (Fig. 5) are similarly provided above and below the point at which the rocket blast coacts with the turbine blades.

All of the various frame and brace members are suitably provided with streamlined casings of the general type shown at 37 in Fig. 6 and as shown and described in my prior patents, No. 1,809,271 and No. 1,929,778.

A special streamlined casing 38 (Figs. 1 and 2) is provided to cover the center brace 35, these casings 38 serving also to reduce bending of the housings 32 about an axis through the centers of the propellers. Additional casings 39 (Figs. 1 and 2) are provided for the propeller shafts and bearings. Any usual mechanism may be provided for varying the pitch of the propeller blades, and such mechanism may be operated through shafts 40 and 41 (Fig. 1) and bevel gears 42.

The outstanding novelty of my present application resides in the means which I have provided for detachably securing the turbine structure above described to the rocket casing portion C', and to special mechanism provided for releasing the turbine structure and for bringing it safely to the ground.

For this purpose, the casing C' is provided with openings 50 (Fig. 8) into which the ends of separate attaching frame members as 35 (Fig. 5) and 51 and 52 (Fig. 1) extend. These frame members are detachably secured by cross-pins 55 slidably mounted in forked frame elements 56 (Figs. 8 and 9) fixed within the casing C'.

A cover plate 57 (Figs. 8 to 10) is yieldingly mounted inside the casing C' and adjacent each opening 50, and each cover plate is normally displaced inward by engagement with the end of a frame member as 51 or 52. When a cross-pin 55 is withdrawn and the associated frame member is released and moves outward, the corresponding cover plate 57 then moves outward to close the opening 50 and to provide a streamlined surface for the casing C'. The cover plates 57 are bevelled top and bottom in order to fit tightly into the openings 50.

In order that the whole turbine and propeller structure may be released without binding, it is necessary that all of the cross-pins 55 be simultaneously withdrawn. In Fig. 9 I have indicated certain fluid-operated mechanism by which this result may be conveniently attained. For this purpose I connect a supply of compressed air at 60 through a pipe 61 and branch pipes 62 to a series of bellows devices B, one for each cross-pin 55. Each cross-pin is connected by a yoke 64 to the outer end of a rod 65 which is attached at its inner end to the inner end of a bellows member 66. When air pressure is supplied through the branch pipes 62, the corresponding bellows members are compressed and the rods 65 are forced outward. The yokes 64 and cross-pins 55 are thus drawn downward (as viewed in Fig. 9) and all of the frame members are simultaneously released.

The flow of air in the pipe 61 is controlled by a valve 70 which may be automatically operated to open when the atmospheric density or pressure falls to a predetermined point. Such automatic operation may be effected by a bellows device 71 (Fig. 9) in which the bellows member may be exhausted and provided with a compressed spring 72.

When the craft is in a dense atmosphere, the atmospheric pressure on the outside of the bellows member will overcome the spring 72 and compress the bellows, holding the valve 70 closed. When the atmospheric pressure has been reduced to a predetermined point, the spring 72 will overcome the atmospheric pressure and will expand the bellows member 71 and open the valve 70, whereupon all of the cross-pins 55 will be withdrawn and the turbine structure will be released.

After the turbine and propeller structure is thus released, it is then necessary to make provision for returning the structure safely to the ground, and I will now describe the special provision which I have made for this purpose.

I provide a main parachute 80 attached to the turbine structure by a cord or cable 81. The parachute 80 is stored in a bag or cover 81ª to which a pilot parachute 82 is attached by a cord 83. The pilot parachute is normally folded and held against the outside of the bag 81ª by a band 85 provided with an explosive device 86 controlled by a time fuse 87. The assembled position of the parachute equipment is shown in Fig. 11.

This equipment is preferably stored in a box 90 which is positioned within the casing member C' and which is closed by an outwardly-opening spring-operated door 91. Storage of the parachutes within the casing C' is desirable, as otherwise the somewhat bulky parachute equipment would increase the air resistance of the streamlined structure to which it would be attached. The fuse 87 may be ignited manually, or automatic provision may be made for lighting the fuse when the cross-pins 55 are withdrawn.

For several reasons, it is desirable that the opening of the parachutes be delayed for a substantial period after the turbine structure is released from the casing C'. At the time of release, the turbine structure will be moving rapidly forward in an upward or inclined direction, so that it would overtake the parachutes rather than being sustained thereby. Furthermore, the parachutes would very probably become entangled with the still rotating propellers 20 and would be torn or otherwise damaged thereby.

If the opening of the parachutes is delayed, the forward motion of the turbine structure will presently cease. The structure will then begin to fall and will shortly assume a position in which the relatively heavy turbine and propeller parts are below the relatively light streamlined supporting frame members.

If the device 86 is then exploded, the band 85 will be ruptured and the pilot parachute 82 will be released to withdraw the bag 81 and free the main parachute 80, which main parachute thereafter controls the descent of the turbine structure.

The spring-operated door 91 yieldingly retains the parachute equipment in the box 90 until the turbine structure is released. The door 91 also closes automatically after the parachute equipment is pulled out and thus completes the streamlined surface of the casing C'.

From the foregoing description the uses and advantages of my invention will be readily apparent. When the aircraft enters a region of reduced atmospheric pressure where the turbines and propellers are no longer effective, the pressure-operated device shown in Fig. 9 will cause the several cross-pins 55 to be simultaneously withdrawn, thus releasing the turbine and propeller structure. As this structure is thereafter separated from the casing C', the parachute equipment will be withdrawn from the box 90, and shortly thereafter the device 86 will be exploded, releasing the pilot parachute which in turn uncovers the main parachute 80 to control further descent of the turbine structure.

The auxiliary turbine structure disclosed in this application comprises very few parts and consists only of the turbines, propellers and supporting frame members. All other necessary devices, such as fuel tank, combustion chamber and nozzle, form a part of the regular equipment of the rocket craft and are continued in effective operation after the turbine structure is detached.

The supporting frame members for the auxiliary turbines are not only streamlined but are of relatively small width, so that the turbine structure presents no substantial air-resistance. For increased strength of the supporting frame members, tubular frame members under pressure may be used as set forth in my prior Patent 2,090,038, or wire-wound tubular members may be used as set forth in my prior Patent No. 2,109,529.

It should also be noted that the relatively small width of the supporting frame members permits these parts to act as additional vanes on the movable casing member C', so that they thus assist in the effective steering action of said movable casing member.

Having thus described my invention and the advantages thereof, I do not wish to be limited to the details herein disclosed, otherwise than as set forth in the claims, but what I claim is:

1. In a rocket craft, a casing, combustion apparatus mounted within said casing and producing a rocket blast issuing rearward therefrom, an auxiliary turbine propelling apparatus detachably mounted on said craft at the rear of said casing and actuated by said rocket blast, frame members supporting said auxiliary turbine and propelling apparatus and detachably secured to the rocket casing, and automatic means to release said frame members and auxiliary apparatus from said craft on the occurrence of a predetermined reduced atmospheric pressure.

2. A rocket craft comprising a casing, means therein to produce a rocket blast issuing rearward therefrom, an auxiliary turbine and propeller apparatus normally positioned in the path of said rocket blast and operated thereby, a supporting frame structure for said turbine and propeller apparatus, means to detachably secure said frame structure to said rocket craft casing, and automatic means to release said frame structure and said auxiliary turbine and propeller apparatus from said casing on the occurrence of a predetermined operating condition.

3. A rocket craft comprising a casing, means therein to produce a rocket blast issuing rearward therefrom, an auxiliary turbine and propeller apparatus normally positioned in the path of said rocket blast and operated thereby, a supporting frame structure for said turbine and propeller apparatus, separate means to detachably secure different parts of said frame structure to said rocket craft casing, and automatic means to release all parts of said frame structure and said auxiliary turbine and propeller apparatus simultaneously from said casing on the occurrence of a predetermined operating condition.

4. A rocket craft comprising a casing, means therein to produce a rocket blast issuing rearward therefrom, an auxiliary turbine and propeller apparatus normally positioned in the path of said rocket blast and operated thereby, a supporting frame structure for said turbine and propeller apparatus, means to detachably secure said frame structure to said rocket craft casing, fluid-operated means to release all parts of said frame structure and said auxiliary turbine and propeller apparatus simultaneously from said craft, and control devices for said fluid-operated means, which devices operate in response to the occurrence of a predetermined reduced atmospheric pressure about said rocket craft.

5. In a rocket craft, a casing, apparatus mounted within said casing and producing a rocket blast issuing rearward therefrom, an auxiliary mechanical propelling apparatus detachably mounted on said craft at the rear of said casing and actuated by said rocket blast, means to release said auxiliary apparatus from said rocket craft, parachute means effective to safely land said detached auxiliary apparatus, and means to delay the action of said parachute means for a predetermined time interval after said auxiliary apparatus and parachute are released from said craft and during which interval motion of said parts in the direction of flight has substantially ceased.

6. In a rocket craft, a casing, apparatus mounted within said casing and producing a rocket blast issuing rearward therefrom, an auxiliary turbine and propelling apparatus detachably mounted on said craft at the rear of said casing and actuated by said rocket blast, means to release said auxiliary turbine and propelling apparatus from said rocket craft, a main parachute attached to said auxiliary apparatus, a pilot parachute which controls the opening of said main parachute, and means automatically set in operation when the auxiliary turbine and propelling apparatus is detached from the rocket craft and effective to release said pilot parachute at a predetermined time interval after said auxiliary apparatus is detached from said rocket craft and during which interval motion of said parts in the direction of flight has substantially ceased.

7. In a rocket craft, a casing, apparatus mounted within said casing and providing a rocket blast isuing rearward therefrom, auxiliary propelling apparatus comprising a pair of combined propeller and turbine elements rotatably mounted on parallel axes, one at each side of the longitudinal axis of said craft and driven by said rocket blast, a relatively heavy frame mounted on said casing and supporting said auxiliary turbines, a light streamlined casing for the turbine rims, and relatively light frame extensions supporting said turbine rim casing, said light frame extensions comprising one set of frames in the plane of the propeller axes, and two additional sets of frames at right angles to said first set of frames.

8. A rocket craft comprising a casing, means therein to produce a rocket blast issuing rearward therefrom, auxiliary turbine and propeller apparatus normally positioned in the path of said rocket blast and operated thereby, a supporting frame structure for said turbine and propeller apparatus comprising a plurality of frame members separately extending within said craft through openings in said casing, cross-pins locking said frame members within said craft, and automatic means to simultaneously withdraw said pins and release said supporting frame members, said automatic means operating in response to the occurrence of a predetermined reduced atmospheric pressure about said rocket craft.

9. A rocket craft comprising a casing, means therein to produce a rocket blast issuing rearward therefrom, auxiliary turbine and propeller apparatus normally positioned in the path of said rocket blast and operated thereby, a supporting frame structure for said turbine and propeller apparatus comprising a plurality of frame members individually extending through separate openings in said casing to points within said craft, cross-pins locking said frame members within said craft, means to withdraw said pins and release said supporting structure, and yieldingly-operated outwardly-movable doors automatically closing the openings in said casing when said frame members are released and withdrawn.

10. The combination in a rocket craft as set forth in claim 9, in which the outwardly-movable doors are pivoted at their forward ends and are provided with beveled forward and rear edges.

11. In a rocket craft, a casing, apparatus mounted within said casing and producing a rocket blast issuing rearward therefrom, an auxiliary mechanical propelling apparatus detachably mounted on said craft at the rear of said casing and actuated by said rocket blast, means to release said auxiliary apparatus from said rocket craft, parachute means effective to safely land said detached auxiliary apparatus, a storage receptacle for said parachute apparatus formed within the rocket craft casing, a yieldingly-operated, outwardly-displaceable door for said casing, and means to automatically close said receptacle after said parachute apparatus is withdrawn therefrom.

12. In a rocket craft, a casing, apparatus mounted within said casing and providing a rocket blast issuing rearward therefrom, and auxiliary propelling apparatus comprising a pair of combined propeller and turbine elements rotatably mounted on parallel axes, one at each side of the longitudinal axis of said craft and both driven by said rocket blast, said propelling apparatus including sets of turbine blades on one propeller coacting with additional sets of turbine blades on the other propeller, the entering edges of the first set of movable blades and the leaving edges of the last set of movable blades being placed at such an angle to the longitudinal axis of the craft that the tangent of said angle equals the ratio of blade speed to gas speed.

13. In a rocket craft, a casing, apparatus mounted within said casing and providing a rocket blast issuing rearward therefrom, and auxiliary propelling apparatus comprising a pair of combined propeller and turbine elements rotatably mounted on parallel axes, one at each side of the longitudinal axis of said craft and both driven by said rocket blast, said propelling apparatus including sets of turbine blades on one propeller coacting with additional sets of turbine blades on the other propeller, the distribution and curvature of said sets of movable blades being such that each turbine element receives substantially the same turning force.

ROBERT H. GODDARD.